United States Patent
Qu et al.

(10) Patent No.: US 10,836,096 B2
(45) Date of Patent: Nov. 17, 2020

(54) METHOD AND DEVICE OF FILM STEPLESS BIAXIAL TENSION BASED ON SADDLE-SHAPED SURFACE TRANSITION

(71) Applicants: South China University of Technology, Guangzhou (CN); Guangzhou Huaxinke Intelligent Manufacturing Technology Co., Ltd., Guangzhou (CN)

(72) Inventors: Jinping Qu, Guangzhou (CN); Guizhen Zhang, Guangzhou (CN)

(73) Assignees: South China University of Technology, Guangzhou (CN); Guangzhou Huaxinke Intelligent Manufacturing Technology Co., Ltd., Guangzhou (CN)

( * ) Notice: Subject to any disclaimer, the term of this patent is extended or adjusted under 35 U.S.C. 154(b) by 341 days.

(21) Appl. No.: 15/559,892

(22) PCT Filed: Dec. 29, 2015

(86) PCT No.: PCT/CN2015/099635
§ 371 (c)(1),
(2) Date: Sep. 20, 2017

(87) PCT Pub. No.: WO2016/150222
PCT Pub. Date: Sep. 29, 2016

(65) Prior Publication Data
US 2018/0056576 A1 Mar. 1, 2018

(30) Foreign Application Priority Data
Mar. 25, 2015 (CN) .......................... 2015 1 0134403

(51) Int. Cl.
*B29C 55/16* (2006.01)
*B29L 7/00* (2006.01)

(52) U.S. Cl.
CPC ............ *B29C 55/165* (2013.01); *B29C 55/16* (2013.01); *B29L 2007/00* (2013.01)

(58) Field of Classification Search
CPC .... B29C 55/165; B29C 55/16; B29L 2007/00
(Continued)

(56) References Cited

U.S. PATENT DOCUMENTS 2,145,044 A * 1/1939 Dungler .................. D06C 3/00
26/72
2,697,248 A * 12/1954 Longstreth ............ B29C 55/285
425/392

(Continued)

FOREIGN PATENT DOCUMENTS

CN 1256999 A 6/2000
CN 102717511 A 10/2012
(Continued)

OTHER PUBLICATIONS

International Search Report dated Feb. 20, 2016; Application No. PCT/CN2015/099635).

*Primary Examiner* — Robert C Dye
*Assistant Examiner* — Guy F Mongelli
(74) *Attorney, Agent, or Firm* — The Dobrusin Law Firm, P.C.

(57) ABSTRACT

The present invention discloses a method and device of film stepless biaxial tension based on saddle-shaped surface transition. In the film surface biaxial stretching process, with the lateral and longitudinal tensile forces applied to a different tangent plane, the film is subjected to smooth transition in a three-dimensional space from a narrow plane via a saddle-shaped surface to a wide plane, with the thickness uniformity of the biaxial tension film regulated by controlling the shape of the saddle-shaped surface; the device comprises a lateral tension unit and a longitudinal tension unit, the angle between the two lateral tension
(Continued)

wheels in the lateral tension unit being adjustable, the two longitudinal tension wheels in the longitudinal tension unit being arranged in parallel; the lateral tension of the film is achieved by the rotation of the lateral tension wheel, and the longitudinal tension of the film is achieved by the linear velocity difference between the lateral tension wheel and the longitudinal tension wheel. The present invention, adopting the binding wheel structure, effectively uses the saddle-shaped surface to regulate the bowing phenomenon, and reduces the contact surface between the film and the tension element, thus preventing the surface performance from deteriorating by friction, which is advantageous for improving the thickness uniformity of the film product.

5 Claims, 2 Drawing Sheets

(58) Field of Classification Search
USPC .......................................................... 264/290
See application file for complete search history.

(56) References Cited

U.S. PATENT DOCUMENTS

| | | | | |
|---|---|---|---|---|
| 2,702,406 A * | 2/1955 | Reed | ..................... | B29C 55/165 26/72 |
| 2,770,007 A * | 11/1956 | Longstreth | ............ | B29C 55/285 425/392 |
| 3,138,824 A | 6/1964 | Brown, Jr. et al. | | |
| 3,179,976 A * | 4/1965 | Nash | ......................... | D06C 3/02 26/91 |
| 3,487,610 A * | 1/1970 | Burton | ..................... | B03C 3/28 96/69 |
| 3,550,257 A * | 12/1970 | Burton | ..................... | B03C 3/28 29/592.1 |
| 3,688,354 A * | 9/1972 | Cohn | ...................... | D06C 3/02 26/52 |
| 3,727,273 A * | 4/1973 | Hyatt | ................... | B65H 23/028 26/91 |
| 3,807,004 A * | 4/1974 | Andersen | ................ | B29C 55/08 26/88 |
| 3,833,973 A * | 9/1974 | Schwarz | .................. | D06C 3/00 26/73 |
| 3,902,230 A * | 9/1975 | Schwarz | .................. | D06C 3/00 26/73 |
| 4,080,692 A * | 3/1978 | Parrillo | .................... | D06C 3/04 26/91 |
| 4,924,563 A * | 5/1990 | Catallo | .................... | D06C 3/02 26/76 |
| 5,307,609 A * | 5/1994 | Kurata | .................. | B29C 55/045 264/290.2 |
| 6,217,260 B1 * | 4/2001 | He | ............................ | E02D 5/54 175/267 |
| 6,457,967 B1 * | 10/2002 | Suzuki | ..................... | B29C 49/28 425/526 |
| 7,007,623 B2 * | 3/2006 | Boatman | ................. | B63B 21/50 114/230.15 |
| 2003/0168782 A1 * | 9/2003 | Suzuki | ................ | B29C 49/4205 264/532 |
| 2005/0180001 A1 * | 8/2005 | Takahashi | .............. | G03B 21/60 359/443 |
| 2006/0115548 A1 * | 6/2006 | Marchante Moreno | | B29C 55/165 425/66 |
| 2007/0228586 A1 * | 10/2007 | Merrill | .................. | B29C 55/023 264/1.34 |
| 2007/0252293 A1 * | 11/2007 | Sato | ........................ | B29C 39/20 264/1.31 |
| 2007/0298228 A1 * | 12/2007 | Ohkawachi | ................ | C08J 5/18 428/211.1 |
| 2009/0032166 A1 * | 2/2009 | Aoshima | ................ | B29C 55/08 156/73.5 |
| 2009/0176037 A1 * | 7/2009 | Otoshi | .................. | B29C 55/165 428/1.1 |
| 2009/0243133 A1 * | 10/2009 | Wong | ................... | B29C 55/143 264/40.6 |
| 2010/0221554 A1 * | 9/2010 | Tsubouchi | ............ | B29C 55/165 428/423.5 |
| 2013/0319525 A1 * | 12/2013 | Nakai | ..................... | B29C 55/14 136/259 |
| 2014/0273210 A1 * | 9/2014 | Baker | ................... | C12M 35/04 435/372 |

FOREIGN PATENT DOCUMENTS

| | | | |
|---|---|---|---|
| CN | 203697467 U | | 7/2014 |
| CN | 104723546 A | | 6/2015 |
| CN | 204585815 A | | 8/2016 |
| GB | 978002 | * | 12/1964 |
| GB | 121146 | * | 8/1968 |
| GB | 1211046 | * | 11/1970 |

* cited by examiner

METHOD AND DEVICE OF FILM STEPLESS BIAXIAL TENSION BASED ON SADDLE-SHAPED SURFACE TRANSITION

FIELD OF THE INVENTION

The present invention relates to the field of polymeric material processing technology, particularly a method and device of film stepless biaxial tension based on saddle-shaped surface transition.

BACKGROUND OF THE INVENTION

Using the biaxial tension technology to produce plastic film can improve the mechanical properties of the film, reduce the permeability to gases, water vapor, etc., enhance transparency, surface gloss and other optical properties of the film, narrow the thickness deviation, and improve the dimensional uniformity.

Currently, the processing technology of producing the biaxial tension film can be divided into two categories: A double-bubble method and a stentering processing method. By the double-bubble method, the materials are melted and extruded by an extruder to form a primary film before being quenched, and are then heated and subjected to the second inflation tension to produce a thin film product. The stentering method of producing and processing the biaxial tension film includes stepwise tension and synchronous tension. With the stepwise tension technology, the longitudinal tension is achieved by a roller with different linear velocity, and the lateral tension is achieved typically by two sets of clamps that clamp the film to move along a guide rail having a set track. However, the stepwise tension film is subjected to a force nonuniformly, and has nonuniform thickness, a large thermal shrinkage rate, poor anisotropy, and poor quality balance.

The German Bruckner company applied a linear synchronous motor to the film synchronous biaxial tension equipment, which used the linear synchronous motor to precisely control the movement speed of the respective clamps on the guide rail, so as to keep high-precision synchronization of the movement of the clamp clamping both sides of the film, thus achieving synchronous biaxial tension of the film. In 2007, the Austrian ANDRITZ company launched a mechanical synchronous biaxial tension technology MESIM, which used a mechanical chain clamp with the telescopic performance to achieve synchronous biaxial tension of the film. An application for a patent for invention No. 201010612820.8 disclosed the plastic film biaxial tension equipment, which was based on the principle of gradually reducing the distance between the inner rail and the outer rail of the tension section front-to-back to change the structure of an M-shaped connecting rod of the outer rail, thereby changing the distance between the clamps in the tension section and achieving synchronous biaxial tension of the film. The invention patent application No. 201310184357.5 disclosed a film synchronous biaxial stretcher based on the principle of using a mechanical clamp to clamp the film to move on a circumferential guide rail so as to achieve synchronous biaxial tension of the film, which is not much different from the traditional mechanical clamping synchronous biaxial tension, except that the linear guide rail was arranged as a circumferential guide rail.

The film produced by the synchronous biaxial tension has better comprehensive performance than the film produced by the stepwise biaxial tension, but the mechanical clamping synchronous biaxial tension technology has the following problems: (1) Due to nonuniform tension, the film is easy to produce a serious bowing phenomenon, which will lead to different molecular orientation of the central and edge parts of the film, as well as different optical properties, permeability and thermal shrinkage rate of the film; (2) the clamps in the clamp assembly are distributed at an interval, and the film stretching process is intermittent tension instead of infinite tension; (3) the clamps in the clamp assembly are distributed as points, and the edge of the film is subjected to a force nonuniformly in the stretching process, with the stretched film nonuniform in thickness and easy to break, not allowing large-angle tension; (4) the clamp assembly itself is complicated in structure and easy to be damaged, and has high production cost; (5) the mechanical clamping synchronous biaxial tension technology has a poor synergistic effect, has relatively high requirements on the basic process, and is demanding for the accuracy of the rail, the motor drive and the control system, resulting in high cost of the film production line.

For the above problems of the present film biaxial tension method and equipment, it is of great significance to develop a new type of film synchronous biaxial tension equipment.

CONTENTS OF THE INVENTION

In order to overcome the defects of the prior art, a purpose of the present invention is to provide a film stepless biaxial tension method based on saddle-shaped surface transition that is simple in principle, easy to control and excellent in the comprehensive performance of the film.

Another purpose of the present invention is to provide a film stepless biaxial tension device based on saddle-shaped surface transition for implementing the above method.

A technical solution of the present invention is as follows: The present invention provides a film stepless biaxial tension method based on saddle-shaped surface transition that, in the film surface biaxial stretching process, applies the lateral and longitudinal tensile forces respectively to a different tangent plane, so that the film is subjected to smooth transition in a three-dimensional space from a narrow plane via a saddle-shaped surface to a wide plane, with the thickness uniformity of the biaxial tension film regulated by controlling the shape of the saddle-shaped surface.

The present invention provides a film stepless biaxial tension device based on saddle-shaped surface transition for implementing the above method, which comprises a lateral tension unit and a longitudinal tension unit, the angle between the two lateral tension wheels in the lateral tension unit being adjustable, the two longitudinal tension wheels in the longitudinal tension unit being arranged in parallel; a binding rope is used to bind the left and right edges of the film to the circumferential surface of the lateral tension wheel and the longitudinal tension wheel; the lateral tension of the film is achieved by the rotation of the lateral tension wheel, and the longitudinal tension of the film is achieved by the linear velocity difference between the lateral tension wheel and the longitudinal tension wheel. By using the synergistic effect of the binding rope with the lateral tension wheel and the longitudinal tension wheel, the lateral and longitudinal tensile forces are applied respectively to a different tangent plane of the film surface, thereby forming a saddle-shaped surface.

The lateral tension unit comprises two lateral sub-units arranged symmetrically, each of which is provided with one lateral tension wheel, with the two symmetrically arranged lateral tension wheels forming a herringbone; the lateral tension wheel is provided at the bottom with a first binding assembly and outside with a first support plate in parallel, and the axle of the lateral tension wheel passes through the first support plate, which is provided vertically at the bottom with an underplate; the underplate is provided at the end near the inlet of the lateral tension unit with a fork positioning column, and at the end near the outlet of the lateral tension unit with a first outlet positioning column, with a fork arranged at the fork positioning column; the respective forks are connected at the end to a first lead screw through a corresponding inlet nut, and the respective first outlet positioning columns are connected to a second lead screw through a corresponding first outlet nut.

The first binding assembly comprises a first binding rope, a first sliding wheel and a first preloaded wheel, the first binding rope being wound on a plurality of the first sliding wheels and provided outside with the first preloaded wheel; and the axle of the respective first sliding wheels passes through the first support plate.

In the lateral tension unit, the angle formed by the ends of the two forks can be adjusted through the first lead screw, and the distance between the lateral tension wheels at the outlet of the lateral tension unit can be adjusted through the second lead screw, thereby regulating the outlet width of the film as it is peeled from the lateral tension wheel to achieve the stepless adjustability of the lateral tension ratio, with the angle β between the two lateral tension wheels generally in the range 0° C. β<180°; in the first binding assembly, first the tensity of the first binding rope on the first sliding wheel is adjusted by the first preloaded wheel, and then the tightness of the film on the sliding wheel is controlled by adjusting the tensity of the first binding rope to ensure that the film is tied tight.

The longitudinal tension unit comprises two longitudinal sub-units arranged symmetrically, each of which is provided with one longitudinal tension wheel, with the two symmetrically arranged longitudinal tension wheels arranged in parallel; the longitudinal tension wheel is provided at the bottom with a second binding assembly and outside with a second support plate in parallel, with the axle of the longitudinal tension wheel passing through the second support plate; the second support plate is provided at the end near the inlet of the longitudinal tension unit with a guide hole, and at the end near the outlet of the longitudinal tension unit with a second outlet positioning column; the respective guide holes are connected with a guide rod, and the respective second outlet positioning columns are connected to a third lead screw through a corresponding second outlet nut.

The second binding assembly comprises a second binding rope, a second sliding wheel and a second preloaded wheel, the second binding rope being wound on a plurality of the second sliding wheels and provided outside with the second preloaded wheel; and the axle of the respective second sliding wheels passes through the second support plate.

In the longitudinal tension unit, the distance between the longitudinal tension wheels can be adjusted through the cooperation between the third lead screw and the guide rod; generally, the distance between the parallel wheels is slightly larger than the distance between the lateral tension wheels at the outlet of the lateral tension unit; in the second binding assembly, first the tensity of the second binding rope on the second sliding wheel is adjusted by the second preloaded wheel, and then the tightness of the film on the sliding wheel is controlled by adjusting the tensity of the second binding rope to ensure that the film is tied tight.

The principle of the film synchronous biaxial tension device based on saddle-shaped surface control is as follows: In the film surface biaxial stretching process, with the lateral and longitudinal tensile forces acting respectively on a different tangent plane, the film is subjected to smooth transition in a three-dimensional space from a narrow plane via a saddle-shaped surface to a wide plane, with the thickness uniformity of the biaxial tension film regulated by controlling the shape of the saddle-shaped surface; a binding rope is used to bind the left and right edges of the film to the circumferential surface of the lateral tension wheel and the longitudinal tension wheel (that is, the first binding rope binds the left and right edges of the film to the circumferential surface of the lateral tension wheel, and the second binding rope binds the left and right edges of the film to the circumferential surface of the longitudinal tension wheel), the lateral tension of the film being controlled by adjusting the angle between the two lateral tension wheels, the longitudinal tension of the film being controlled by adjusting the linear velocity difference between the lateral tension wheel and the longitudinal tension wheel; meanwhile the longitudinal tension unit can pull the film to both sides in the width direction and flatten and shape it, and only the edge of the film contacts the device in the longitudinal stretching process, with the film surface having no friction damage.

Compared with the current mechanical clamp-type device, the present invention has the following beneficial effects:

1. Under the action of an external force, the film produces continuous synchronous biaxial tension, and forms in the three-dimensional space a saddle-shaped surface similar to the hyperbolic paraboloid. By controlling the shape of the saddle-shaped surface, the present invention can effectively regulate the film bowing phenomenon, thickness uniformity, and microstructure.

2. By adjusting the first lead screw and the second lead screw, the angle between the lateral tension wheels can be changed, thereby adjusting the lateral tension ratio; by using the continuous binding effect of the binding rope on the film and the tensile effect of the lateral tension unit, the stepless synchronous biaxial tension of the film is achieved.

3. In the biaxial stretching process, the binding rope is in line contact with the film, thus preventing the edge of the film from being subjected to a nonuniform force in the stretching process due to the gap between the traditional clamps, which is advantageous for improving the thickness uniformity of the film product.

4. In work, the bind rope is always in the same plane, there is no space distortion and other complex deformation, and the width of the binding rope is not restricted; meanwhile, the binding rope does not need to overcome the friction resistance, bears small load, and has a longer life.

5. The binding rope is simple in the winding compression way and running track, the synchronous tension of the lateral tension unit is easy to control, and the structure and parts of the device are simple and easy to manufacture and assemble and have relatively low requirements on the basic process, avoiding the issue that the traditional clamp-type tension device is demanding for the accuracy of the rail, the motor drive and the control system and other issues, reducing the cost of the film production line.

DETAILED DESCRIPTION OF THE EMBODIMENTS

The present invention will be further described in detail below with reference to examples; however, the embodiments of the present invention are not limited thereto.

EXAMPLE

Figure 1:
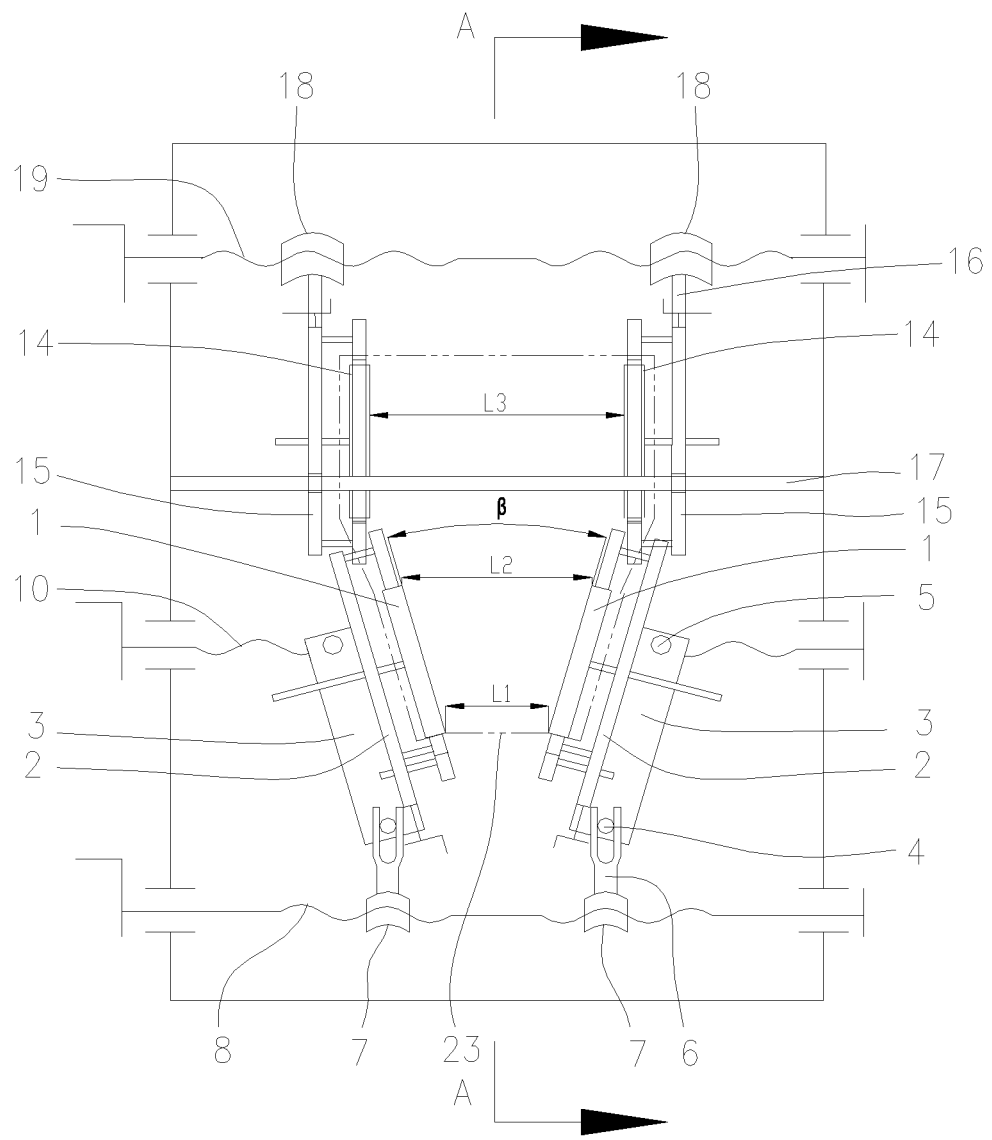
FIG. 1 is a schematic diagram of the structure of the film stepless biaxial tension device based on saddle-shaped surface transition, which is in the biaxial tension state at this time.

This example provides a film stepless biaxial tension device based on saddle-shaped surface transition, as shown in FIG. 1, which comprises a lateral tension unit and a longitudinal tension unit disposed in turn along the film transport direction, the angle between the two lateral tension wheels in the lateral tension unit being adjustable, the two longitudinal tension wheels in the longitudinal tension unit being arranged in parallel; a binding rope is used to bind the left and right edges of the film to the circumferential surface of the lateral tension wheel and the longitudinal tension wheel, and the lateral tension is achieved while the film is transported forward by the rotation of the lateral tension wheel; the longitudinal tension is achieved while the film is transported forward based on the linear velocity difference between the lateral tension wheel and the longitudinal tension wheel; by using the synergistic effect of the binding rope with the lateral tension wheel and the longitudinal tension wheel, the lateral and longitudinal tensile forces are applied respectively to a different tangent plane of the film surface, thereby forming a saddle-shaped surface.

Figure 2:
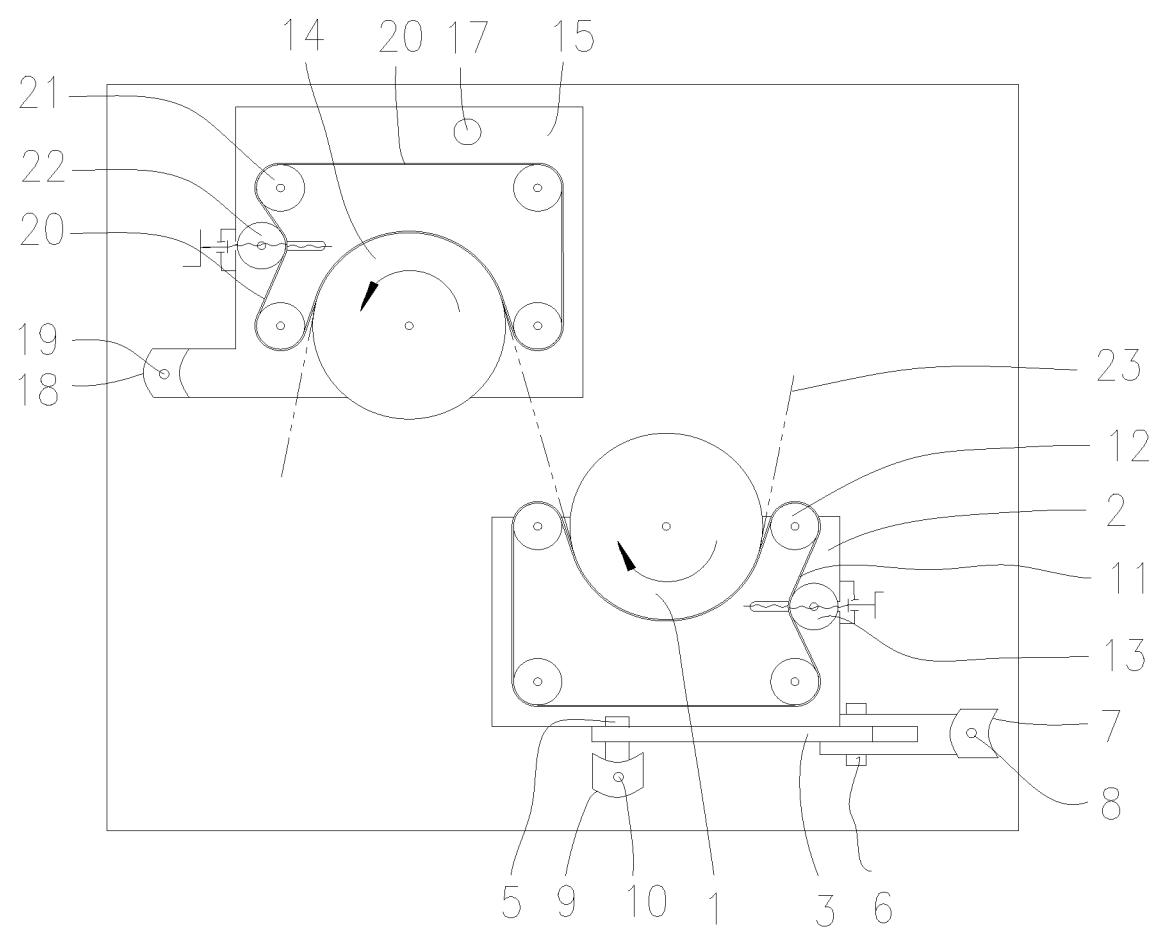
FIG. 2 is a schematic diagram of the structure of the A-A section in FIG. 1.

As shown in FIG. 1 or 2, the lateral tension unit comprises two lateral sub-units arranged symmetrically, each of which is provided with one lateral tension wheel 1, with the two symmetrically arranged lateral tension wheels forming a herringbone; the lateral tension wheel is provided at the bottom with a first binding assembly, and outside with a first support plate 2 in parallel, and the axle of the lateral tension wheel passes through the first support plate, which is provided vertically at the bottom with an underplate 3; the underplate is provided at the end close to the inlet of the lateral tension unit with a fork positioning column 4, and at the end near the outlet of the lateral tension unit with a first outlet positioning column 5, with a fork 6 arranged at the fork positioning column; the respective forks are connected at the end to a first lead screw 8 through a corresponding inlet nut 7, and the respective first outlet positioning columns are connected to a second lead screw 10 through a corresponding first outlet nut 9. The first binding assembly comprises a first binding rope 11, a first sliding wheel 12 and a first preloaded wheel 13, the first binding rope being wound on four first sliding wheels and provided outside with the first preloaded wheel; and the axle of the respective first sliding wheels passes through the first support plate. The fork is provided with a U-shaped groove, and the underplate is slid in the U-shaped groove through the fork positioning column. With respect to the centerline of the film 23, the left and right threads on the first lead screw rotate in the opposite direction, so do the left and right threads on the second lead screw. In the lateral tension unit, the angle formed by the ends of the two forks can be adjusted through the first lead screw, while the distance between the lateral tension wheels at the inlet is adapted to the width L1 of the film at the inlet, and the distance between the lateral tension wheels at the outlet of the lateral tension unit can be adjusted through the second lead screw, thereby regulating the outlet width L2 of the film as it is peeled from the lateral tension unit to achieve the stepless adjustability of the lateral tension ratio; the angle β between the two lateral tension wheels is generally in the range 0°>β>180°. The edges of both sides of the preheated film are pressed by the first binding rope on the circumferential surface of two synchronously rotating lateral tension wheels, and the film is tightly and uniformly bound without gaps, so that the film is subjected uniformly to a tensile force in the lateral expansion process, the thickness of the stretched film product is more uniform, and the dimensional stability of the product is improved.

The longitudinal tension unit comprises two longitudinal sub-units arranged symmetrically, each of which is provided with one longitudinal tension wheel 14, with the two symmetrically arranged longitudinal tension wheels arranged in parallel; the longitudinal tension wheel is provided at the bottom with a second binding assembly, and outside with a second support plate 15 in parallel, with the axle of the longitudinal tension wheel passing through the second support plate; the second support plate is provided at the end near the inlet of the longitudinal tension unit with a guide hole, and at the end near the outlet of the longitudinal tension unit with a second outlet positioning column 16; the respective guide holes are connected with a guide rod 17, and the respective second outlet positioning columns are connected to a third lead screw 19 through a corresponding second outlet nut 18. The second binding assembly comprises a second binding rope 20, a second sliding wheel 21 and a second preloaded wheel 22, the second binding rope being wound on four second sliding wheels and provided outside with the second preloaded wheel; the axle of the respective second pulleys passes through the second support plate. With respect to the centerline of the film, the left and right threads on the third lead screw rotate in the opposite direction. In the longitudinal tension unit, the distance between the parallel wheels can be adjusted through the cooperation between the third lead screw and the guide rod; generally, the distance between the two longitudinal tension wheels is slightly larger than the distance between the two lateral tension wheels at the outlet of the lateral tension unit; in the second binding assembly, first the tensity of the second binding rope on the second sliding wheel is adjusted by the second preloaded wheel, and then the tightness of the film on the sliding wheel is controlled by adjusting the tensity of the second binding rope to ensure that the film is tied tight. The longitudinal tension unit has a binding assembly similar to the lateral tension unit and an independent preloaded structure of the binding assembly, except that the second support plate in the longitudinal tension unit is fixed to the guide rod and the third lead screw, the synchronous relative movement of the parallel wheels is achieved by rotating the third lead screw, the two wheels keep parallel, the distance L3 between the parallel wheels is slightly larger than the peeling distance L2 of the film at the outlet of the lateral tension unit, the film goes into the longitudinal tension unit after being stretched by the lateral tension unit, the film is flattened under the compression effect of the second binding rope, and the ratio of the linear velocity of the longitudinal tension wheel to the lateral tension wheel is adjusted to achieve the longitudinal stepless tension of the film.

Figure 3:
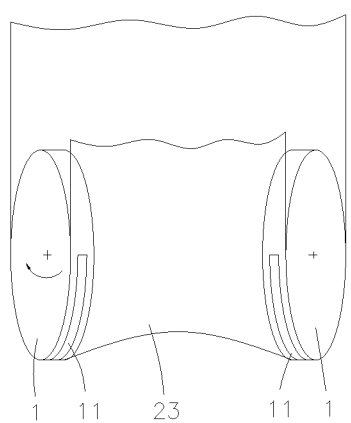
FIG. 3 is a schematic diagram of the structure of the film at the lateral tension unit forming the saddle-shaped surface.

The principle of the film stepless biaxial tension device based on saddle-shaped surface transition is as follows: In the film surface biaxial stretching process, with the lateral and longitudinal tensile forces acting respectively on a different tangent plane, the film is subjected to smooth transition in a three-dimensional space from a narrow plane via a saddle-shaped surface to a wide plane (as shown in FIG. 3), with the thickness uniformity of the biaxial tension film regulated by controlling the shape of the saddle-shaped surface. The left and right edges of the film are bound by a binding rope to the circumferential surface of the lateral tension wheel and the longitudinal tension wheel, the lateral tension of the film being controlled by adjusting the angle between the two lateral tension wheels, the longitudinal tension of the film being controlled by adjusting the linear velocity difference between the lateral tension wheel and the longitudinal tension wheel; meanwhile the longitudinal tension unit can pull the film to both sides in the width direction and flatten and shape it, and only the edge of the film contacts the device in the longitudinal stretching process, with the film surface having no friction damage.

The present invention can be well implemented as described above. The examples as described above are only the preferred examples of the present invention, and are not intended for limiting the scope of the present invention; that is, variations and modifications consistent with the present invention are intended for being encompassed by the scope of the present invention as claimed by the appended claims.

What is claimed is:

1. A film biaxial tension device characterized in that: the device comprises a lateral tension unit and a longitudinal tension unit, wherein a wheel angle between two lateral tension wheels in the lateral tension unit being adjustable wherein the wheel angle being an angle between non-parallel rotation directions of the two lateral tension wheels, two longitudinal tension wheels in the longitudinal tension unit being arranged in parallel; binding portions against the two lateral tension wheels and the two longitudinal tension wheels are used to bind opposing edges of the film to a circumferential surface of the lateral tension wheels and the longitudinal tension wheels; a lateral tension of the film is achieved by the rotation of the lateral tension wheels, and a longitudinal tension of the film is achieved by a linear velocity difference between the lateral tension wheels and the longitudinal tension wheels; wherein the binding portions around the two lateral tension wheels and the two longitudinal tension wheels provide uniform tension on the film, without using clamps that provide non-uniform tension on the film; wherein the binding portions follow the shapes of the two lateral tension wheels and the two longitudinal tension wheels, where the binding portions press the film against the two lateral tension wheels and the two longitudinal tension wheel; and, in operation of the of the film biaxial tension device, lateral and longitudinal tensile forces are applied respectively in different planes such that the film forms a saddle-shape surface during a transition from a narrow plane to a wide plane, wherein a uniformity of thickness of the film is regulated by controlling a shape of the saddle-shaped surface.

2. The film biaxial tension device according to claim 1, characterized in that: the lateral tension unit comprises two lateral sub-units arranged symmetrically with respect to a central line, each of which is provided with one lateral tension wheel of the two lateral tension wheels; each of the two lateral tension wheels is provided with a first binding assembly, and with a first support plate in parallel with the respective lateral tension wheel, and an axle of each of the two lateral tension wheels passes through the first support plate, which is provided with an underplate; the underplate is provided proximal to an inlet of the lateral tension unit with a fork positioning column, and at an end near an outlet of the lateral tension unit with a first outlet positioning column, with a fork arranged at the fork positioning column; the respective forks are connected at the end to a first lead screw through a corresponding inlet nut, and the respective first outlet positioning columns are connected to a second lead screw through a corresponding first outlet nut.

3. The film biaxial tension device according to claim 1, characterized in that: the longitudinal tension unit comprises two longitudinal sub-units arranged symmetrically with respect to a central line, each of which is provided with one of the two longitudinal tension wheels, with the two longitudinal tension wheels arranged to rotate in parallel directions; each of the two longitudinal tension wheels is provided with a second binding assembly, and with a second support plate in parallel, with an axle of each of the longitudinal tension wheels passing through the second support plate; the second support plate is provided proximal to an inlet of the longitudinal tension unit with a guide hole, and at an end near an outlet of the longitudinal tension unit with a second outlet positioning column; respective guide holes are connected with a guide rod, and the respective second outlet positioning columns are connected to a third lead screw through a corresponding second outlet nut.

4. The film biaxial tension device according to claim 3, characterized in that: the second binding assembly comprises a second binding rope, a second sliding wheel and a second preloaded wheel, the second binding rope being wound on a plurality of the second sliding wheels and provided external of the second preloaded wheel; and the axle of the respective second sliding wheels passes through the second support plate.

5. The film biaxial tension device according to claim 1, characterized in that: the wheel angle of the two lateral tension wheels is in the range $0°<\beta<180°$.

* * * * *

UNITED STATES PATENT AND TRADEMARK OFFICE
CERTIFICATE OF CORRECTION

PATENT NO. : 10,836,096 B2
APPLICATION NO. : 15/559892
DATED : November 17, 2020
INVENTOR(S) : Jinping Qu and Guizhen Zhang Page 1 of 1

It is certified that error appears in the above-identified patent and that said Letters Patent is hereby corrected as shown below:

In the Claims

Column 7, Lines 46-47 delete "longitudinal tension wheel;" and insert --longitudinal tension wheels;--

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*